FIG. 1

INVENTOR.
LEROY U.C. KELLING
BY
*Irving Kayton*
ATTORNEY

Dec. 28, 1965   L. U. C. KELLING   3,226,649
PULSE TRAIN PHASE MODULATOR FOR CONTROL SYSTEM
Filed Sept. 5, 1961   3 Sheets-Sheet 2

INVENTOR.
LEROY U.C. KELLING
BY
Irving Kayton
ATTORNEY

Dec. 28, 1965   L. U. C. KELLING   3,226,649
PULSE TRAIN PHASE MODULATOR FOR CONTROL SYSTEM
Filed Sept. 5, 1961   3 Sheets-Sheet 3

INVENTOR.
LEROY U.C. KELLING
BY
*Irving Kayton*
ATTORNEY

United States Patent Office 3,226,649
Patented Dec. 28, 1965

3,226,649
PULSE TRAIN PHASE MODULATOR FOR
CONTROL SYSTEM
Leroy U. C. Kelling, Waynesboro, Va., assignor to General Electric Company, a corporation of New York
Filed Sept. 5, 1961, Ser. No. 136,420
15 Claims. (Cl. 328—71)

This invention has to do with electronic automatic control systems, and more particularly with numerical control systems for controlling the motion, in a preferred embodiment, of the cutting element of a machine tool relative to the workpiece in order to describe a contoured or complicated cutting path on the workpiece.

In the class of machine tool control equipment known as "Numerical Contouring Control" systems, the magnitude of the commanded velocity of the workpiece relative to the cutting tool is of great importance at every instant during the cutting operation. Consider, in a metal milling machine, cutting an irregular shape involving a combination of straight lines and circular arcs in the surface of a metallic plate. The optimum velocity with which workpiece and cutting tool move relative to each other in this situation are determined by several limiting factors in addition to the desire to proceed with the operation as rapidly as possible. For example, the thickness of the metal to be cut, the composition of the alloy or compound of which the metal is comprised, the hardness and melting point of the cutting tool, the amount and type of coolant that may or may not be applied to the cutting tool as it cuts through the metal are factors that enter into the consideration of the optimum speed. Too high a velocity of relative motion results in damaging the workpiece, or the cutting tool, or both. In contouring control, therefore, direct and positive velocity control is required at all times.

Of equal importance is control of the path length and direction of the cut or sequence of path cuts. Since contour cutting often involves intricate path shapes, the displacement of the cutting tool relative to the workpiece must be under constant, and carefully predetermined control.

The requirements of contouring control may be considered analogous to some of the modern safety driving tests or races recently developed for both automobiles and pleasure boats. In such races, the course that the vehicle must travel is carefully predetermined and a safe speed is also carefully determined for each leg of the route. The winner of such a race is the one who comes closest to following the prescribed route at the predetermined safe speed.

The predetermined speed, path length and direction for each leg or cut which the machine tool is constrained to follow under the direction or command of a contouring control system is typically fed into the control system in numerical form programmed on punched tape or punched cards, although in certain applications magnetic tape containing the digital information is used. This numerical input data is routed to appropriate sub-systems of the control system, whereupon the control function is set into operation. In order that the numerical information be utilized by the electronic control equipment, the input data must be presented in an electrical form compatible with the overall system and which enables the control system to accurately control the speed and path of the machine tool relative to the workpiece. One form of representation of the velocity and path length data, known in the art, is a train of electrical pulses. In such a representation, each pulse in the train corresponds to a discrete increment of motion of the cutting tool relative to the workpiece, such that if the control system generates X pulses, the machine tool, in obeying the command of the control system, moves a distance of X times the incremental distance defined by each pulse.

In the preferred embodiment, herein subsequently to be described, the incremental distance represented by each pulse is .0001 of an inch. If the control system were to generate 100,000 pulses, for the purpose of determining a path length, then the total motion that would be traversed by the cutting tool relative to the workpiece would be 100,000 times .001, or 10 inches.

When each pulse represents an incremental distance, the frequency of the pulses, i.e., the pulse repetition rate, defines velocity and may be used to control the speed of motion of the machine tool. This is so, since pulse rate is convertible into increments of distance per unit time. In the preferred embodiment, the length of each cut is commensurate with numbers of pulses, and speed of motion of the cutting tool relative to the workpiece is commensurate with pulse frequency or rate.

The general organization of the automatic control system comprehends that the path length and velocity commands of the control system are represented by the phase and rate of change of phase, respectively, of a pulse train applied to a servo mechanism which in turn is coupled to, and drives, the machine tool. A sensing mechanism observes the position of the machine tool as the machine tool responds to the command signals, and generates a pulse train whose phase relative to a reference is representative of the present actual position of the machine tool. The phase of the command position signal is compared with the phase of the actual position signal so that an error signal directly proportional to the phase difference may be generated to provide feed back control in the feed back loop of the servo mechanism. The magnitude of the error signal, and its sense or polarity (determined by whether the phase of the command signal leads or lags that of the actual position signal) causes the machine tool to move in such direction as to tend to reduce the magnitude of the error signal.

The same basic pulse rate and phase relative to a reference is provided for the command signal as for the machine tool feed back signal so that, with a commanded velocity of zero and an actual tool velocity of zero, two equal frequency and in-phase pulse rates are applied to the comparison means. This results in a zero difference or error signal, and nothing happens. When the commanded velocity is other than zero, means is provided for continuously changing the phase of the basic pulse command signal relative to the reference. Comparison of this phase modulated command pulse train with the phase of the feed back signal of the machine tool which is still at rest will indicate a phase difference increasing in magnitude.

The means known in the art, for phase modulating the pulse train proportional to commanded velocity, is a counter to which the basic unmodulated pulse train is applied as an input, and with which the pulses of an additional pulse train whose rate is commensurate with command velocity, are inter-leaved. In this way, the output of the counter is the sum of the two pulse trains. Such an arrangement, however, requires a counter which must be operative at a pulse rate which is at least double that of the basic clock pulse rate, since additional pulses are interleaved therebetween.

In accordance with the principles of the invention, however, it is possible to add pulses to, or subtract pulses from, the basic pulse rate (or to permit the basic pulse rate to be counted undisturbed) with a counter which need operate at no higher pulse rate than the basic pulse rate commensurate with a commanded velocity of zero. In accordance with the principles of the invention, the second pulse rate is applied to the counter in synchronism with the basic pulse rate, rather than inter-leaved therewith. The first or input decade of the counter, however, is a variable rate counter decade. This decade will either count regularly, or will count two for each input pulse, or will not count at all for an input pulse, dependent upon whether the basic pulse train is to be left undisturbed, or to be added to, or subtracted from, respectively.

The novel features which are believed to be characteristic of the invention are set forth with particularity in the appended claims. The invention itself, however, both as to its organization and method of operation, together with further advantages and objects thereof, may best be understood by reference to the following description taken in connection with the accompanying drawings.

*Numerical contouring system—In general*

Figure 1:
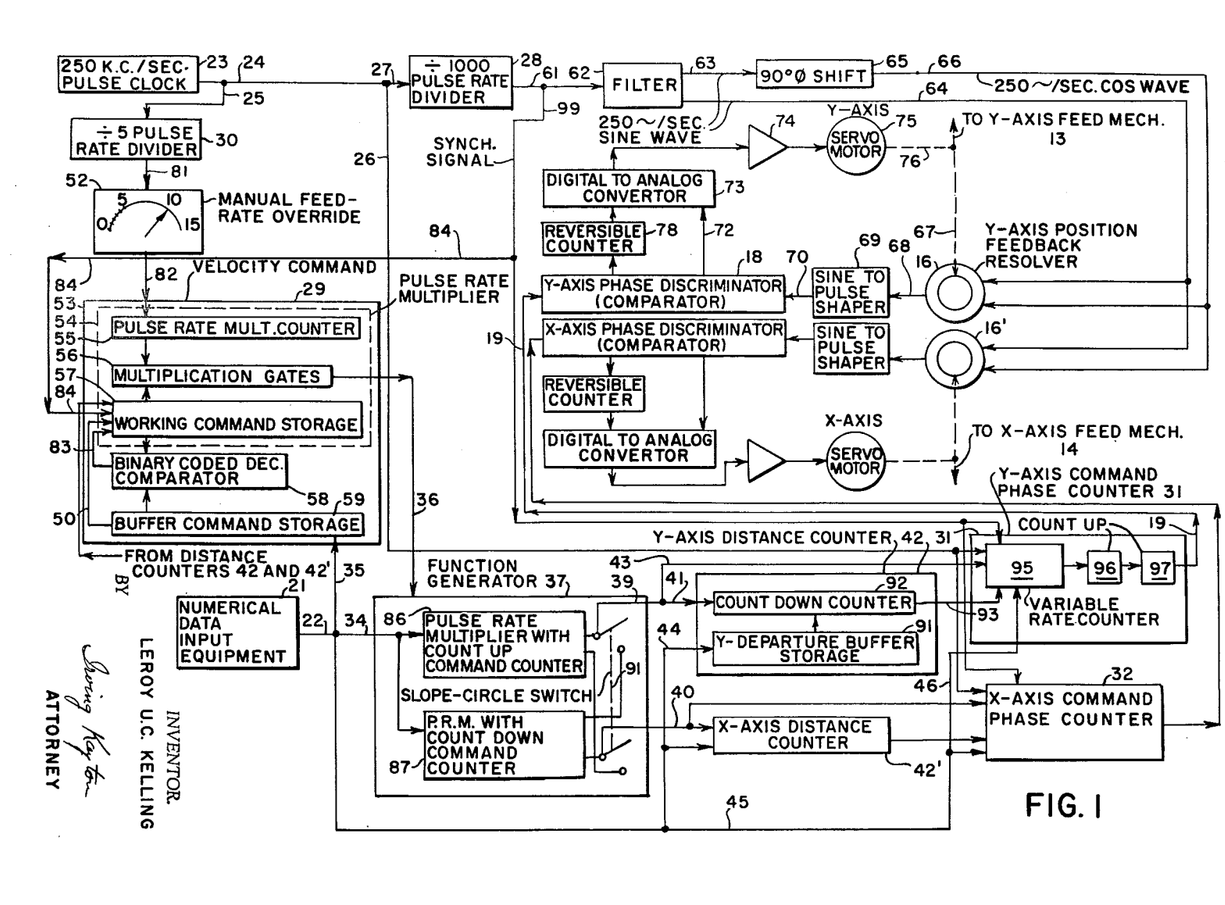
FIG. 1 is a block diagram of a numerical contouring control system shown in sufficient detail to highlight the environment within which the various features of the invention are found.

Referring to FIGURE 1, there is disclosed a general block diagram of the overall numerical contouring control system. FIGURE 1 is presented primarily to show the interrelationship of the three broad sections of the system; they are the machine tool itself, the servo system loop, and the overall electronic control section. The machine tool and the control section are coupled by the servo mechanism loop. The description relative to FIGURE 1 of the overall function of the system, and broad relationship of the sub-systems within these three sections, will provide a basis for more readily comprehending the detailed description of the system arrangement and operation, as well as the detailed logic circuitry of the sub-systems which highlight the various aspects of the invention, and which will subsequently be described in detail.

The numerical contouring control system, as represented in FIGURE 1, may be viewed as comprising three broad sections. The purpose of the entire system, of course, is to control, automatically, a machine tool by a Y-axis feed mechanism 13, and an X-axis feed mechanism 14. Feed mechanisms 13 and 14 comprise appropriate drive shafts and gearing which actuate the machine element for motion along the two coordinates. It is to be understood that the system may be utilized for controlling machine elements in additional coordinates, but to simplify the explanation of the principles of the invention, a description of the third coordinate has been omitted. The machine element may be the cutting tool, itself, or may be the table holding the workpiece which is to be contoured. Alternatively, feed mechanisms 13 and 14 may control both the cutting tool and the motion of the workpiece. For the purposes of this discussion, assume that the machine element represents the cutting tool.

There is a servo loop for each of the two feed mechanisms. The Y-axis servo loop and the X-axis servo loop are structurally independent of each other in their action in driving the feed mechanisms. Since the equipment throughout the system for the X coordinate is precisely the same as for the Y coordinate, solely the Y coordinate system will be described, except where a discussion of the equipment of both coordinates is required for clarification. The Y-coordinate servo loop comprises a Y-axis position servo, including a D.C. amplifier driving a servo motor 75 which actuates the Y-axis feed mechanism 13. Simultaneously, the motor 75 drives the Y-axis position feed back synchro resolver 16. The output of the position feed back resolver 16 provides an electrical representation of the position of the machine in the Y-coordinate since both the feed mechanism 13 and resolver 16 are driven in common by the position servo motor 75.

The resolver 16 is coupled to the Y-axis phase discriminator or comparator 18. The discriminator's function is to compare the actual position of the machine in the Y-coordinate, as represented by the Y-axis position feed back resolver 16, on the one hand, with the commanded position from the control section. Thus, the phase of the command signal entering the Y-axis phase discriminator 18 from the left on lead 19 is compared with the phase of the actual feed back position signal which comes into discriminator 18 from the resolver 16. The difference in the phase between the command signal and the feed back signal is commensurate with the difference between the commanded position and the actual position. This phase difference is utilized for generating an error signal which is then fed into the servo mechanism. The servo mechanism drives the Y-axis feed mechanism in accordance with the instantaneous error signal. The servo mechanism loop, therefore, comprises the Y-axis position servo, the Y-axis position feed back synchro resolver 16 and the Y-axis phase discriminator 18. Discriminator 18 is also common to the control section now briefly to be outlined.

The input to the control section of the overall numerical contouring control system is the numerical input data equipment block 21 which accepts numerical command data. Input equipment 21 may be a punched tape, punched card, or magnetic tape, digital input sub-system. For the purposes of the numerical contouring control system under discussion, punched tape has been found to be particularly advantageous. Numerical input data equipment 21 reads the instructions and addresses on the input tape so as to generate the appropriate electrical signals requisite for controlling the machine element. Typically, the numerical input information is in a coded digital form related to the speed with which the cutting element is to travel while performing its contouring function; it also indicates the X and Y departures and their direction for that cut, or the arc center offsets of the circular path to be generated if that particular cut is to be an arc of a circle. The instructions from input equipment 21 are then routed throughout the control section in accordance with the programmed addresses.

Another type of input is also provided for the control section in the form of a train of pulses generated from a reference clock or oscillator 23. This pulse clock, as is well known in the digital computer art, provides the carrier by which the command signals are transported throughout the control section; it also provides a reference pulse rate input to the servo loop section. Thus, the output of the pulse train generator or clock 23 is applied along its ouput lead 24 to both the control section of the contouring system along leads 25 and 26, and also to the servo loop section on lead 27. Lead 27 is coupled to the input of the position feed back resolver 16 through the intermediary of a pulse rate divider 28, while the output from clock 23 is applied to the control section on lead 25 as an input to the velocity command block 29, through the intermediary of the pulse rate divider 30. There is no pulse rate divider in lead 26 between clock 23 and the Y-axis command phase counter 31. The insertion of pulse rate divider 30 in lead 25, and divider 28 in lead 27, as well as the absense of a pulse rate divider in lead 26, result in adapting the reference pulse rate from clock 23 for use in different parts of the system having different functions and operating characteristics.

The pulse rate fed into the control section, and the total number of pulses fed into the control section for any given path, define the commanded velocity with which it is desired the machine tool shall move and the total length of the path it is desired that the machine tool traverse. In short, the pulse rate and the total number of pulses are the mechanisms upon which the electronic equipment in the control section operate to provide command signals, subsequently to be converted into the velocity and distance of travel executed by the machine tool.

The funtion of the velocity command block 29 is to convert a reference pulse rate entering from the pulse rate divider 30 into a pulse rate represented by a number (commensurate with required velocity of motion) punched into the input tape and fed into the system at input data equipment 21. This number is referred to as the feed rate number. The feed rate number is therefore applied from input 21 along leads 22 and 35 as another input to the velocity command 29. If the punched tape commands a feed rate number of 200 inches per minute, the velocity command 29 would operate upon the pulse rate to provide an output pulse rate on lead 36 of 33.3 kilocycles per second (which is equal to 200 inches per minute with each pulse representing .0001 of an inch). Velocity command block 29 also performs the very important functions of manual feed rate over-ride and automatic acceleration and deceleration. The output pulse rate, commensurate with command velocity, is applied on lead 36 to the function generator 37.

The function generator operates in two modes. The first mode generates command signals for straight line cuts at any angle, sometimes referred to as slope generation or linear interpolation. The second mode generates command signals to perform circular line cuts with a specified radius, also referred to as circular interpolation. For the purposes of discussion relative to FIGURE 1, consider function generator 37 in its relationship to the rest of the system operating solely in the first mode as a slope generator.

Function generator 37 resolves the command velocity entering on lead 36 into two component pulse rates commensurate with required velocities in the X and Y directions. The resolution is performed in accordance with the X and Y departures programmed into the punched tape and applied to the function generator 37 from input equipment 21 along the leads 22 and 34. Thus the input pulse rate to function generator 37 is multiplied by a factor which is directly proportional to the sine of the slope angle of the path cut relative to the X axis to obtain the required Y component of velocity, and is multiplied by the cosine of that angle in order to obtain the required X component of velocity. The X and Y outputs of function generator 37, therefore, are two pulse rates commensurate with the Y and X components of velocity required for the motion of the cutting tool. The X and Y pulse rates are applied as outputs on lead 40 and 39, respectively. Between 39 and 40, the X and Y feed mechanisms 13 and 14 of the machine tool, the circuitry for handling the output on lead 39 is identical to that for the output on lead 40. Accordingly, the following discussion will be restricted to the Y coordinate system.

The Y pulse rate output on lead 39 from the function generator 37, is applied to two different circuits, simultaneously. Along lead 41 from lead 39, it is applied to the Y-axis distance counter 42, while along lead 43 from lead 39, it is applied to the Y-axis command phase counter 31. Distance counter 42 controls the length of the path along which the machine travels for the cut being made. Command phase counter 31 controls (relative to the position feed back resolver 16 through the intermediary of the discriminator 18) the velocity of motion of the machine for the cut.

Since each pulse represents an incremental distance which the cutting tool travels, counting the pulses in distance counter 42 that exit from function generator 37 is the same thing as measuring the distance which the cutting tool travels along the path. When counter 42 totals a number of pulses equal to the desired path length, its operation stops as does the movement of machine tool cutting element. Counter 42 is informed at the beginning of each path, as to the total count required to achieve the desired path length. The input data is applied to counter 42 from input equipment 21 along leads 22 and 44.

The motion of the machine tool is controlled in the command phase counter 31. In command phase counter 31, not only is the required Y coordinate pulse rate applied thereto along lead 43, but the reference clock pulse rate is also applied as an input from clock 23 along leads 24 and 26. Consider what happens if the Y feed rate command requires no motion in the Y direction, and the simultaneous condition that the machine tool is at rest in correspondence with the command. Under these circumstances, the pulse rate output from function generator 37 on lead 39 is zero, thereby maintaining a constant phase on the phase modulated pulse train output from phase counter 31. Both phase counter 31 and resolver 16 are adapted to provide outputs which are of precisely the same pulse rate, and in phase, under these conditions. Accordingly, there is a zero error signal output from phase discriminator 18 and the cutting element remains motionless. However, if a pulse rate output from function generator 37 does appear on leads 39 and 43, and therefore a pulse train representing a commanded velocity is fed into command phase counter 31, then the pulses on lead 43, as well as the clock pulses on lead 26, are counted by phase counter 31. If the direction of motion commanded by the programmed tape is in a negative direction, the pulses on lead 43 are subtracted from the clock pulses in the command phase counter. Whether the direction is positive or negative with respect to the Y coordinate, is indicated to command phase counter 31 by a signal applied from the input equipment 21 along leads 22, 45 and 46. The addition or subtraction of pulses in the command phase counter 31 has the net effect of either advancing or retarding the phase of the output pulses from the phase counter on lead 19, respectively, relative to the output pulse train from the synchro resolver 16. Accordingly, the position servo drives the Y-axis feed mechanism in the appropriate direction and at a rate proportional to the error signal developed in discriminator 18. As Y-axis feed mechanism 13 continues its motion, it will eventually traverse the entire distance required for the specific cutting operation. When this distance is completed, it is recognized in the Y-axis distance counter 42 and a blocking signal is generated therefrom along lead 93. This blocking signal is applied to command phase counter 31 in a manner so as to stop the input thereto from function generator 37. When this happens, pulse rate signals can no longer be added to the clock pulse rate in command phase counter 31, with the result that the phase of the output from phase counter 31 can no longer be changed.

The X axis is operated in a similar fashion. Additional details of the system are provided in an article entitled "Inside The Mark Century Numerical Controls," by Evans and Kelling; Control Engineering, volume 10, No. 5, May 1963, pages 112–117.

*Command phase counter*

Figures 2, 3, 6:
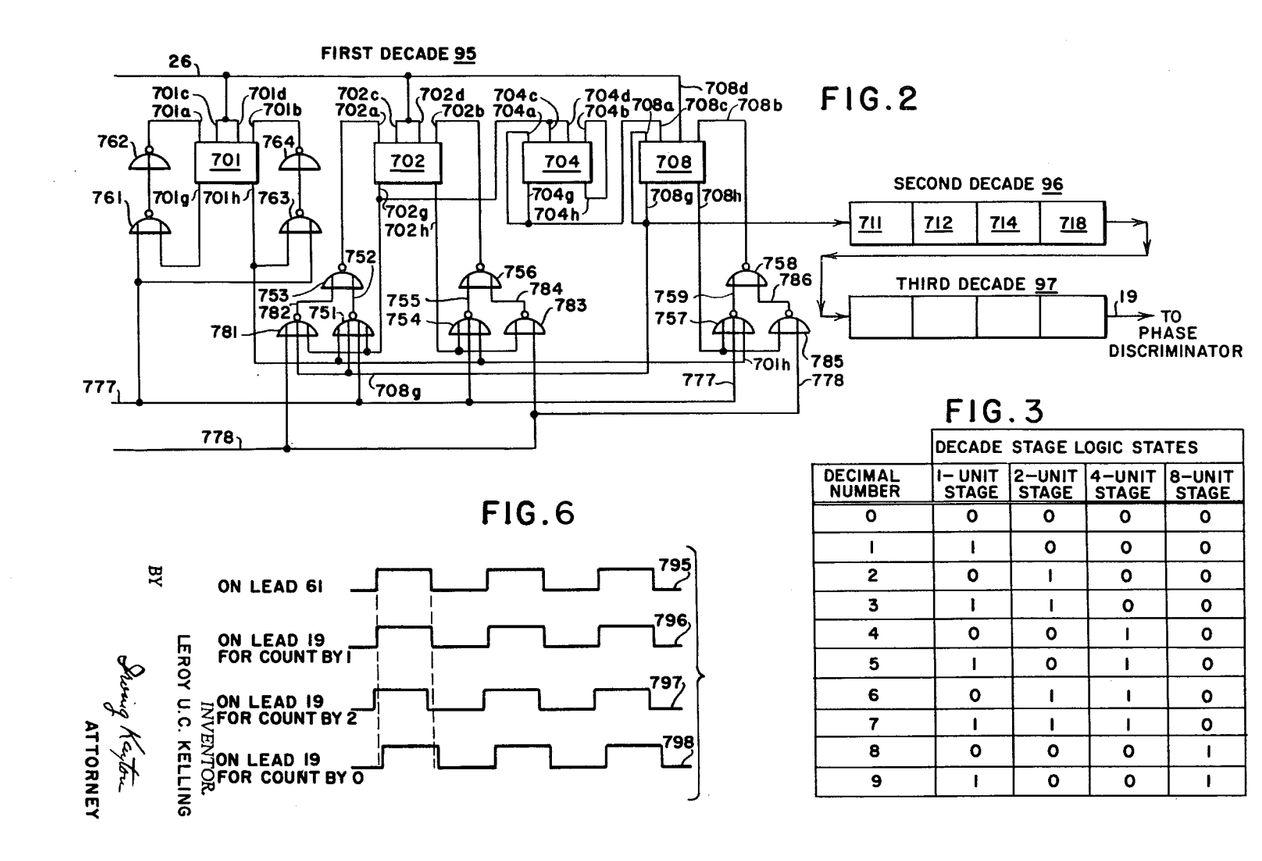
FIG. 2 is a diagram of a command phase counter showing the details of a variable rate decade in accordance with the principles of the invention.
FIG. 3 is a table of binary-coded-decimal states of a decade representing decimal digits.
FIG. 6 is a timing diagram of the waveforms produced by the command phase counter of FIG. 2 for certain illustive operating conditions.

FIG. 2 is the circuit of the command phase counter 31 shown in block form in FIG. 1 and previously described to the extent of its relationship to the subsystems of FIG. 1. It may be recalled that the output of the command phase counter 31 is a phase modulated pulse train applied on output lead 19 to phase discriminator 18 for comparison with the phase modulated pulse train representative of the actual position of the machine tool. The phase counter counts the incoming 250 kilocycles per second clock pulse train on lead 26 down to an output 250 cycles per second pulse train on lead 19. This is so because phase counter 31 comprises three decades, indicated in FIG. 2 as the first, second, and third decades. Further-more, the output of phase counter 31 is phase modulated by virtue of either adding pulses (from function generator 37 on lead 43) to the clock pulse train applied on lead 26, or subtracting them from the clock pulse train, dependent upon whether the velocity is to be positive or negative and therefore whether the output phase of the counter is to be increasing in the leading or lagging sense.

Each of the three decades of FIG. 2 comprises four binary stages so as to represent a decade in binary-coded-decimal form of the type wherein the first binary stage, which represents the least significant digit in that decade, has the decimal weight of 1; the second stage is weighted 2; the third stage is weighted 4; and the fourth stage is weighted 8. The first decade shown on the left is the units decade; the second the tens decade; and the third is the hundreds decade.

The second and third decades are identical to each other. The first decade, which is the input decade, may include all the circuitry typical of a fixed rate count up counter but additionally includes special logic circuitry which permits the first decade to count at a variable rate. To comprehend the manner in which the first decade functions as a variable rate counting decade, it is first necessary to understand the operation of a binary-coded-decimal decade in a fixed rate mode of operation.

Consider the second decade. Each of its four stages, 711, 712, 714, and 718, comprises a counter flip-flop stage. The permutations of the output states of the four stages for ten successive clock pulse inputs to the first stage 711 is shown in FIG. 3.

In FIG. 3, the left-hand column represents the decimal numbers 0 through 9 that may be represented in the second decade by logic state permutations in binary-coded-decimal form. Counting from 0 through 9 is achieved by pulsing the input stage 711 ten times, successively. The second through fifth columns of FIG. 3 represent the states of the four counter stages of the decade for the decimal digits 0 through 9. Thus, each row of FIG. 3 commences with a decimal number followed by a permutation of four logic states for the four binary stages which constitutes the binary-coded-decimal representation for that decimal number.

This representation is for the typical counting arrangement for a binary-coded-decimal count-up decade in fixed rate operation. Reference to the 1-unit stage column demonstrates that it changes state with each input pulse. Stage 712 (the 2-unit stages) changes state on every second input pulse applied to stage 711 except over end from 9 to 0. The 2-unit stage 712 pulses the 4-unit stage 714 to the one state on the fourth input pulse to the 1-unit stage 711 and to the zero state on the eighth input pulse to 711. When 4-unit stage 714 switches to the zero state, it pulses the 8-unit stage to the one state. On the tenth input pulse to 1-unit stage 711, its change of state pulses the 8-unit stage 718 so as to change the state of stage 718 to the zero state, thereby producing an output pulse on the lead to the next decade (on the output lead 19 to the phase discriminator 18 in the instance of the third decade). Thus this output occurs at the completion of every tenth count to the input stage 711. The 2-unit stage is precluded from changing state with the application of the tenth pulse to the 1-unit stage, by a blocking signal generated by the 8-unit stage when it switches to a one state for the decimal counts of 8 and 9. All four stages are then in their zero state representing decimal digit zero.

This is the type of counting that is required for the first decade when fixed rate counting is to occur. It may be recalled that fixed rate counting is to occur when there is an absence of pulses on input lead 43 from function generator 37, or when the input pulses on lead 43 are blocked by the output on lead 93 from the distance counter (see FIG. 1).

When there are pulses applied to the first decade on lead 43 and simultaneously there is an indication for a negative direction of motion along the Y coordinate, then one pulse is to be blanked from the clock pulse train on lead 26 for every pulse that appears on lead 43 from the function generator. This is equivalent to subtracting a pulse from the totality of pulses in the clock pulse train for every pulse that appears on lead 43. This blanking operation is accomplished at the input to the first stage of the variable rate input decade. This occurs for each pulse on lead 43 as long as there is a negative direction signal controlling the operation of the counter.

When, however, the movement along the Y coordinate is to be in the positive direction, the counter should count not only the pulses of the clock train on lead 26 but also the pulses applied to the counter on lead 43 from the function generator. This is accomplished by having the counter count two rather than one for every simultaneous occurrence of a pulse on lead 26 and on lead 43 at the input to the variable rate decade. To make the counter count two counts instead of one, it is necessary to change the states of the counter stages by the equivalent of a count of two. This is accomplished when the counted is registering a count of 0 to 7 inclusive by changing the state of the 2-unit stage of the variable rate decade rather than changing the state of the input 1-unit stage.

Looking at the table of FIG. 3 for the rows 0 through 7, it may be seen that changing the state of the 2-unit counter stage and leaving the 1-unit counter stage undisturbed does, in fact, change the permutations of the stages such that a count of two rather than a count of one is accomplished. In the decimal digit 0 row, changing the 2-unit stage from zero to one results in a permutation of states identical to the permutation for states for decimal digit row 2. Changing that same 2-unit stage from zero to one for decimal digit row 1 results in the identical permutation of states shown in decimal row 3.

The situation for the successive decimal number is somewhat different. In decimal row 2, changing the state for the 2-unit stage from one to zero, does not, of and by itself, result in the permutation of states required for decimal row 4. However, changing the state of the 2-unit stage from one to zero automatically results in an output from the 2-unit stage to the 4-unit stage, whereby the 4-unit stage is changed from the zero state to the one state. This is the same as the permutation of states representing decimal row 4. A similar effect accomplishes the change of permutations from the decimal 3 representation to the decimal 5 representation.

The decimal 4 row is changed to the decimal 6 row in the same way as the decimal 0 and 1 rows were changed to the decimal 2 and 3 rows, respectively. In the same way, the decimal 5 row is converted to the decimal 7 row.

The decimal 6 row, on the other hand, is somewhat more complicated. Changing the state of the 2-unit stage from one to zero results in pulsing the 4-unit stage from one to zero. However, at this point, pulsing the 4-unit stage from one to zero also produces an output to the 8-unit stage which pulses it from zero to one. This provides the appropriate representation for decimal row 8. It may be seen that changing the decimal row 6 by changing the 2-unit stage results in exactly the same thing as changing the 2-unit stage for decimal row 7, i.e., it is the same as the change brought about from decimal row 7 to decimal row 8, ignoring the 1-unit stage which is unaffected when the 2-unit stage is pulsed. The change in state of the 2-unit stage of decimal row 7 in a similar manner results in a permutation which is the same as that of decimal row 9. This change in state from one to zero in pulsing the 2-unit stage of decimal row 7, results in an output pulse which changes the 4-unit stage from state one to state zero and a pulse to the 8-unit stage which changes the state from zero to one.

When a count of 2 is to be added to a permutation of states representing decimal 8 or 9, however, the state of the 8-unit stage must be changed rather than the state of the 2-unit stage. That changing the state of the 8-unit stage will, in fact, do the job may readily be seen. Decimal 8 plus 2 is equal to decimal 10; this means the entire decade must go to 0 (a 0 on each of the four stages of that decade) with an output or carry pulse over to the next decade. Decimal row 8 shows that the only stage that is in the one state is the 8-unit stage. Changing that state to zero results in all four stages being zero and produces, of necessity, an output pulse to the next stage. Similarly, adding or counting 2 onto the permutation of decimal row 9 should produce decimal 11, which is the same as a decimal 1 with a carry over to the next decade. It may be seen that changing the 8-unit stage in decimal row 9 from one to zero, results in a permutation exactly the same as that shown in decimal row 1 and, of necessity, produces an output pulse to the next decade from the 8-unit stage.

The circuitry required in the variable rate counter for gating the 2-unit and 8-unit stages in accordance with the above description and for blocking the application of clock pulses to the counter when a negative direction Y coordinate signal is applied is shown in detail in the circuitry of the variable rate counter decade 95 of FIG. 2.

Figure 4:
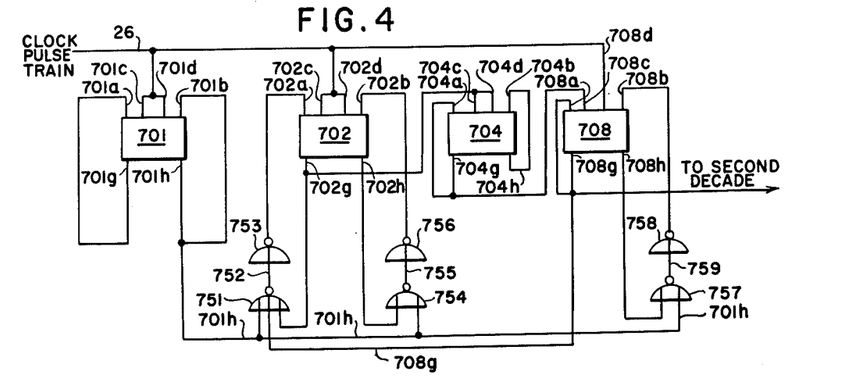
FIGS. 4 and 5 are two diagrams showing decade circuits included in the variable rate decade of FIG. 2.

Decade 95 of FIG. 2 has circuitry which may best be understood by considering it in parts. Thus, before going into a detailed explanation of all of the circuitry of decade 95 in FIG. 2, reference will be made to the fixed rate binary-coded-decimal decade shown in FIG. 4, and then to the decade shown in FIG. 5. The decade of FIG. 4 is a fixed rate count up decade, the exact circuitry of which is included in the variable rate decade 95 of FIG. 2. Thus, the circuitry of the decade of FIG. 4 may be used for the second decade 96 and the third decade 97 of FIG. 2. On the other hand, a more conventional fixed rate binary-coded-decimal counter decade may be used for decades 96 and 97, such as is disclosed in FIGS. 9–1 of "Digital Computer Components and Circuits," by R. K. Richards, D. Van Nostrand Co., Inc, 1957, at pages 399 and 400. After the fixed rate decade of FIG. 4 is explained, reference will be made to the decade of FIG. 5 which is identical to that of FIG. 4 except that additional circuitry is added so that the application of an appropriate signal will completely arrest the counting operation of the decade, while the absence of that signal permits the decade to count in the same fixed rate manner as it does in FIG. 4. The decade 95 in FIG. 2 will then be explained since it includes all of the circuitry of the decades of FIGS. 4 and 5 plus additional logic components which constrains decade 95 to count by two.

Consider now, the fixed rate binary-coded-decimal counter of FIG. 4. Four flip-flops, 701, 702, 704, and 708 are arranged in sequence corresponding to the 1-unit, 2-unit, 4-unit, and 8-unit stages of the decade and disposed with the least significant digit on the left. The clock pulse train is applied on lead 26 to the tied trigger input leads 701c and 701d of the 701 stage, and to the tied trigger input leads 702c and 702d of the 702 stage; in addition, input lead 26 is applied as the reset trigger lead input 708d of stage 708. The set trigger input lead 708c of stage 708 is taken from the 704g output lead of stage 704. Thus, whether or not a set trigger pulse is applied to the 708 stage through the set trigger lead 708c, depends upon whether or not the state of stage 704 is switching from the one to the zero logic level. Similarly, the tied input comprising trigger leads 704c and 704d of stage 704 is taken from the 702g output lead of stage 702.

The state of any of the 701, 702, 704, and 708 stages is determined by the left-hand output leads of those stages designated as 701g, 702g, 704g, and 708g, respectively.

Each one of the four stages is arranged as a binary counting stage in the sense that each output lead is applied back to the steering input. The logic is, therefore, descriptive of their operation with the exception of stage 708 which, as indicated above, does not have its set and reset trigger input leads 708c and 708d tied together.

Although each of the four stages is a counter stage, some of the closed steering loops have additional logic components, and therefore switching conditions, included within the loops. Thus, in the set steering loop of stage 702, is a three-input NOR gate 751 whose output 752 is applied as an input to an inverter 753 (single input NOR gate). The output of inverter 753 is the set trigger input 702a. The inputs of the NOR gate 751 are the output lead 702g of the 702 stage, the output lead 701h of stage 701, and the output lead 708g of stage 708. In similar manner, the reset steering loop of stage 702 includes a two-input NOR gate 754 whose output lead 755 is the input to inverter 756, whose output in turn is reset steering lead 702b. The inputs to NOR gate 754 are the output lead 702h of stage 702 and the output lead 701h of stage 701. It may be seen that the sequence of a NOR gate followed by an inverter provide the logical OR function, i.e., with inputs A and B to the NOR gate, the output C from the inverter is equal to A or B.

The right-hand or reset steering loop of stage 708 similarly includes a NOR gate 757 followed by an inverter 758. The output from stage 708 to the next succeeding decade is from the output lead 708g.

Stage 701 is identical so that every application of a clock pulse on lead 26 switches the state of stage 701 to the alternate state.

With the logic circuit of the decade arranged as in FIG. 4, fixed rate binary counting is performed with successive input pulses on lead 26 in accordance with the diagram of FIG. 3; thus, the permutations of states of the four stages of the counter of FIG. 4 for ten successive input pulses on lead 3 are as represented in FIG. 3. With the circuit of FIG. 4, this fixed rate binary-coded-decimal decade is completely defined. However, in order to get a better sense of the circuitry so as to more readily comprehend the variable rate operation of the decade of FIG. 2, let us examine, in some detail, the operation of the logic components in the steering loops of stages 702 and 708 of FIG. 4.

Consider first stage 702. It may be noted that the clock train is applied to the tied trigger leads 702c and 702d from lead 26. If NOR gates 751, 753, 754, and 756 were not included in the steering loops then stage 702 would operate as a regular counting stage and would change state for each pulse applied on lead 26. However, as was discussed above and as can be seen from the 2-unit stage column of FIG. 3, the state of the 702 stage is not supposed to change state with every clock pulse but rather is supposed to change state for every other pulse in the clock train (except the tenth). The NOR gate circuitry in the loop insures this latter operation. It may be noted that the output lead 701h from the 1-unit stage 701 is applied as an input to both the NOR gates 751 and 754. With stage 701 in the zero state, 701h output lead is in the one state and, therefore, a logic one signal is applied to both NOR gates 751 and 754. Of necessity, NOR output leads 752 and 755 are in state zero while the outputs from inverters 753 and 756 must, of necessity, be in state one. This means that the 702a and 702b steering inputs to the 702 stage are in the one state. When the set and reset steering leads (A and B) are in the one state there cannot be a change in the state of that stage whether or not a pulse is present on the trigger input leads. Accordingly, stage 702 cannot change state with the application of the next clock pulse and the state of that stage remains the same. When, however, stage 701 changes to the one state, as it does with the application of the next clock pulse, then its 701h output lead will be in the zero state. An application of a zero logic signal to NOR gates 751 and 754 cannot, in itself, produce a one on the 702a and 702b steering leads. Consequently, the 701h output lead cannot block a change in state of the 702 stage with the application of the next clock pulse. Accordingly, the 702 stage does change state (barring the effect of the 708g output from stage 708 acting as an input to NOR gate 751) and stage 702 does change state in accordance with the requirements of FIG. 3.

The 2-unit stage column of FIG. 3, and the discussion above, indicate that an additional constraint must be placed on the 702 stage. Although it is true that stage 702 should change state for every other input pulse as the decimal number representation for that decade goes from 0 to decimal number 9, the fact remains that in going from decimal number 9 to demical number 0, the 2-unit stage should not change state. Thus, the 2-unit stage for decimal numbers 8 and 9 must be in state zero, and it must also be in state zero for the decimal numbers 0 and 1. The output lead 708g from 8-unit stage 708, as shown in FIG. 4, is applied as an input to NOR gate 751. Looking at the permutations of states for decimal number 9 in FIG. 3, shows that the 1-unit stage is in state one. That means the 701h output lead from stage 701 is in state zero and consequently, cannot provide a signal to block the change of state of stage 702 with the next clock pulse unless something more is done. The permutation of states for decimal number 9, however, shows that the 8-unit stage is in state one. Therefore, the output 708g from stage 708 is in the one state and is applying a one along the 708g input lead to NOR gate 751. This means that the 702a steering input to the 702 stage must, of necessity, be in the one state. At the same time, with stage 702 in the zero state as required for the permutation representing decimal number 9, the 702h output lead of that stage is in the one state and, therefore, a one is applied on the 702h lead to the NOR gate 754. Consequently, a one signal is applied to the 702b reset steering input to that stage. With a one at the 702a and 702b inputs to the 702 stage, the next clock pulse cannot change the state of the 702 stage; it is completely blocked from changing states. As a result, changing from the permutation representing decimal number 9 to that representing decimal number 0 is effected properly in that the 2-unit stage remains in the zero state.

By way of brief recapitulation then, the NOR gates 751, 753, 754, and 756 in the steering loops of the 702 stage perform the function of insuring, firstly, that stage 702 does not change state for every clock pulse but rather changes state for every other clock pulse, and secondly, with output 708g from stage 708 coupled to NOR gate 751, it is insured that when the decade changes its representation from decimal number 9, stage 702 remains in its zero state (even though it would ordinarily change to a one state) so as to properly represent the permutation for decimal number 0.

NOR gates 757 and 758 in the reset loop of stage 708 are included for the purpose of insuring that that stage operates in accordance with the typical requirements of a binary-coded-decimal counter decade. If this were a pure binary counter, the application of a clock pulse when the decade represents decimal number 9 would not change the 8-unit stage since a binary counter represents numbers from 0 through 15. In a binary-coded-decimal counter, however, the application of a clock pulse to the counter when it represents decimal number 9 should switch it to a condition representing decimal number 0. Therefore, the 8-unit stage must be switched from a one state to a zero state in order for the counter to go from 9 to 0. This is the function of gates 757 and 758, i.e., to switch the 708 stage from a one state to a zero state after stage 708 has been in the one state for two successive clock pulses. Changing stage 708 from one to zero also, and simultaneously, provides an output pulse from stage 708 to the next succeeding decade in the chain, since a change in logic level from one to zero is a pulse out.

To understand how stage 708 is switched from state one to state zero after it represents decimal number 9, requires knowing the states of all of the input leads to the 708 stage while the decade represents decimal 9. Since trigger input leads 708c and 708d are not tied together, the operation of stage 708 is more complicated than that of stages 701, 702, and 704. Consider the state of the input leads to stage 708 when stage 708 is in state one and the entire decade represents decimal number 9. Under these circumstances the 708g output lead and, therefore, the 708a steering lead are both in the one state. The 708h output lead is necessarily in the zero state and so a zero is applied on the 708h lead to the input of NOR gate 757. However, the second input lead to NOR gate 757 is in the 701h lead. Since stage 701 is in state one, lead 701h is in state zero. Accordingly, with both inputs to NOR gate 757 being zero, output lead 759 is in the one state. The output of inverter 758, and the 708b reset steering lead, are therefore in the zero state. No pulse is applied to set trigger lead 708c since it is derived from output lead 704g of stage 704. Since stage 704 did not change state for two successive pulses, it cannot be applying a pulse to the set trigger input 708c. The reset trigger input 708d to stage 708, is, however, the clock pulse train input lead 26 and, accordingly, a pulse is present on that lead. Thus, the state of all the input leads to the 708 stage are as follows: 708a is in state one, 708b is in state zero, 708c has no pulse applied, and 708d does have a pulse applied. Under this set of conditions, reference to the truth table of FIG. 4H demonstrates that stage 708 must change state from one to zero. Since state 708 changes from one to zero, and stage 702 as previously described does not change from its zero state, the permutation representing decimal number 9 is converted to the permutation representing decimal number 0.

Figure 5:
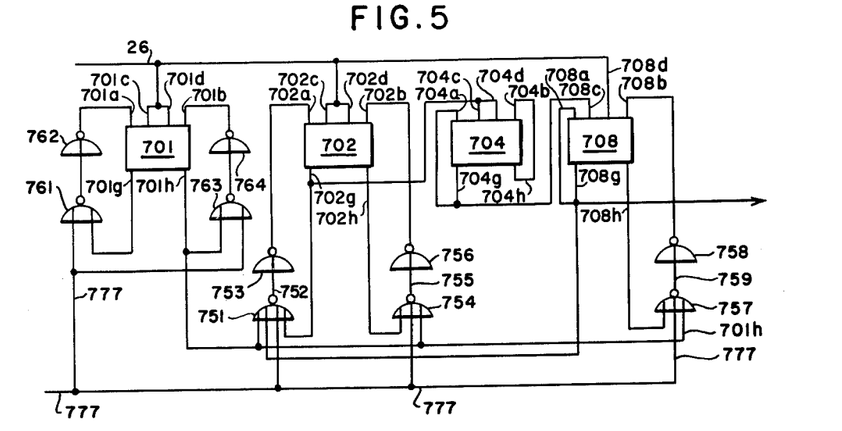

FIG. 5 is a replica of the decade of FIG. 4 except that NOR gate 761 and inverter 762 have been inserted in the set steering loop of stage 701, and NOR gate 763 and inverter 764 have likewise been inserted in the reset steering loop of stage 701. Additionally, a counter steering pulse input line 777 is applied as a second input to NOR gate 761 and as a second input to NOR gate 763. This lead is additionally applied as an input to NOR gates 751 and 754 of the set and reset steering loops of stage 702 and to NOR gate 757 in the reset steering loop of stage 708. Since the arrangement of inverter 762 relative to NOR gate 761 is such that the inverter takes its input from the output of the NOR gate, and similarly for inverter 764 and NOR gate 763, the operation of these logic components is analogous to the sets of NOR gates and inverters described relative to FIG. 4.

The circuit of FIG. 5 operates exactly the same as that of FIG. 4 when the input lead 777 has applied thereto a logic state zero signal. When a logic state one signal is applied on lead 777, however, the entire decade is blocked from counting, i.e., the decade does not count at all even though clock input pulses are being applied to the decade on lead 26. That this is the case may be readily seen by viewing the three stages that could conceivably change their states with the application of a clock pulse on lead 26. It may be recalled that clock pulses are applied on lead 26 to the 701c and 701d trigger inputs of stage 701, to the 702c and 702d trigger inputs of stage 702, and to the 708d reset trigger input to stage 708. If none of these three is to change state with the application of a clock pulse then each of the three must be blocked by the logic one signal applied on lead 777. In the case of the 701 stage this obviously happens. The lead 777 is applied as inputs to the NOR gates 761 and 763; with a one on these inputs the outputs of the NOR gates must be zero. These are followed by the inverters 762 and 764, so that the outputs of these inverters and, therefore, the 701a and 701b steering leads are at logic state one whenever the input lead 777 is as logic state one. It may be recalled that having a one signal on both steering leads completely blocks any change in state of that stage. With a zero input on lead 777, however, the NOR gates 761 and 763 as well as the inverters 762 and 764 act as if they did not appear in the circuit. The application of a logic one signal on input lead 777 to the NOR gates 751 and 754 coupled to stage 702 performs exactly the same function as those described immediately above relative to stage 701. Consequently the 702 stage is blocked with the application of a one signal on the 777 lead.

In the case of stage 708, the only times when it is ordinarily possible for the 8-unit stage to change state, is when the decade is changing from decimal number 7 to decimal number 8, and when it is changing from decimal number 9 to decimal number 0. At all other times, the 708 stage remains in the state at which it was before the preceding clock pulse. From the earlier description of the decade of FIG. 4, it may be recalled that the logic states for the various inputs to stage 708 as it is about to switch from its decimal number 7 to decimal number 8 condition, and as it is about to switch from its decimal number 8 to its decimal number 0 condition, are such that it can switch under those circumstances if, and only if, a logic state of zero exists at the 708b input. However, with a logic one input to NOR gate 757 from the input lead 777, the 708b input lead must, of necessity, be at logic state one. This means that stage 708 cannot change its state, i.e., cannot change from a zero to a one state, while the decade is representing decimal number 7 and cannot change from a one to a zero state when the decade is representing decimal number 9. Thus, the added circuitry in the FIG. 5 either permits the decade of FIG. 5 to count regularly as does the decade of FIG. 4, or it prevents it from counting at all dependent upon whether there is a logic zero signal or a logic one signal on input lead 777.

Referring now to FIG. 2 and the first decade 95 thereof, it may be seen that all of the circuitry of FIG. 5 is incorporated in decade 95, and additionally circuitry is included so that the decade may operate as a variable rate counter in accordance with the principles of the invention. That which appears in decade 95 of FIG. 2 which is absent from FIG. 5 is as follows: a NOR gate 781 is associated with the set steering loop of stage 702 in that the output of the three input NOR gate 781 is applied as a second input to the NOR gate 753 previously described. In FIGS. 4 and 5 the NOR gate 753 operated exclusively as an inverter. Now, with the additional input 782 from the output of NOR gate 781, NOR gate 753 operates as a two input NOR gate. Similarly, in the reset steering loop of stage 702 is a two input NOR gate 783 which has its output 784 applied to the NOR gate 756 in the same manner as was described for NOR gate 781. A two input NOR gate 785 is associated with the reset steering loop of stage 708 in a similar manner, in that the output 786 of NOR gate 785 constitutes a second input to the previously described NOR gate 758. A third input to the decade, i.e., in addition to leads 26 and 777, is lead 778 which constitutes an input to each one of the three NOR gates 781, 783, and 785. The NOR gate 781 additionally has two more input leads; the first is 708g which is from the 708 stage; and the second is 702g from the 702 stage. The second input of NOR gate 783 is 702h while the second input to NOR gate 785 is 708h.

Depending upon the logic states of the input leads 777 and 778, decade 95 either counts the clock pulses coming in on lead 26 straightforwardly one at a time, or does not count the clock pulse coming in at all, or registers a count of two for the clock pulse coming in on lead 26.

More specifically, the decade provides:

A normal count by one when lead 777 is in the zero state and 778 is in the one state;

A count of zero when lead 777 is in the one state and lead 778 is in the one state;

A count of two when lead 777 is in the one state and lead 778 is in the zero state.

The circuitry in decade 95 of FIG. 2, over that shown in FIG. 5, operates with the circuitry of FIG. 5 to produce its effect. Consider first that variable rate decade 95 is to count normally, i.e., a count of one for each clock pulse. This occurs when lead 777 is in state zero and lead 778 is in the one state. Why this is so may be seen from looking at the NOR gates 781, 783, and 785. Each of these NOR gates has an output of zero and, therefore, leaves the respective succeeding NOR gates 753, 756, and 758 unaffected when the input to each of the NOR gates 781, 783, and 785 is a one. Therefore, a one applied on input 778 assures that no new factors are interjected into the circuit above what were considered in connection with FIG. 5. Secondly, consider that decade 95 is to count by zero for each clock pulse (as will be recalled from FIG. 5, this occurs when lead 777 is in the one state). For the same reasons as described immediately above, putting the input lead 778 into the one state assures that it in no way affects the logic arrangement of the decade and so the lead 777 logic state of one controls the decades and blocks its operation.

It is when the 778 input is equal to zero, however, that decade 95 can and will count by two rather than by one or zero. Lead 777 under these circumstances, must be one for the purpose of making sure that the decade is blocked from counting in its normal one count, and the count by two circuitry can take over. It may be recalled that the binary-coded-decimal counter counts by two when the decade is in the decimal 0 through decimal 7 logic conditions, inclusive (see FIG. 3) merely by changing the state of the 2-unit stage 702. The state of stage 702 can change if, and only if, leads 702g and 702a are in the same state as each other, and leads 702h and 702b are in the same state as each other (under the assumption, of course, that input lead 777 is in state one). The state of zero on lead 778 is applied to stage 702 circuitry through NOR gates 781 and 783. It is this state of zero which is responsible for making the states of 702g and 702a equal to each other, and the states of 702h and 702b equal to each other, so that an input trigger pulse on 702c can change the state of that stage.

Consider the set steering loop of stage 702 under the assumption that 702g is in the zero state. Under these circumstances the input lead to 781 and 702g is zero; the input lead 778 to NOR gate 781 is zero since that is the count by two state of the 778 lead; and 708g input lead to NOR gate 781 will also be zero since decade 95 is representing a decimal number from 0 to 7, inclusive, and this requires that the 708 stage be in its zero state. With the three inputs to NOR gate 781 in the zero state, the ouput of the NOR gate must be one. Consequently, input lead 782 to the succeeding NOR gate 753 is in the one state and the output lead of NOR gate 753, which constitutes the set steering lead 702a, must be in its zero condition. Thus, if 702g is in its zero state, then 702a must also be in its zero state due to the action of the NOR gate 781 with the presence of a zero signal on the 778 lead. Now, consider the set steering loop under the assumption that 702g in its one state. Lead 702g applies a one to both the NOR gates 781 and 751. This means that each of the outputs 782 and 752, respectively, are in the logic zero state. NOR gate 752 receiving two zero inputs must have a logic one output on the 702a lead. Consequently, lead 702a must be in the one state when lead 702g is in the one state. In this way, the circuitry insures that the 702a set steering input lead is always in the same state as the 702g output lead whenever input lead 777 is in the one condition and lead 778 is in the zero condition. In exactly the same manner, the circuitry of the reset steering loop of stage 702 operates to insure that reset steering input lead 702b is always in the same state as the 702h lead. In this way, variable rate decade 95 always has its 2-unit stage switch with a clock pulse with the appropriate combination of 777 and 778 input conditions when the entire decade represents any decimal number from 0 through 7, inclusive.

When decade 95 represents decimal number 8, or decimal number 9, however, counting by two requires that the 8-unit stage 708, rather that the 2-unit stage, change its state with a clock pulse. The circuitry added by virtue of the NOR gate 785 in the reset steering lead of stage 708 is responsible for providing this result. Looking at NOR gate 757, it may be seen that one of the inputs is lead 777 which is in the one state for the count by two operation. This means that output lead 759 of NOR gate 757 must be in its zero condition. NOR gate 785, on the other hand, has two inputs both of which are in the zero state, i.e., input lead 778 is in its zero state appropriate for the count by two conditions and input lead 708h is necessarily in the zero condition since the 708 stage must be in the one condition in order to represent decimal number 8 or 9. Accordingly, the only two input leads to NOR gate 785 are in the zero condition and, therefore, the output lead 786 thereof is in the one condition. NOR gate 758, receiving its input from NOR gate 785, has a logic one applied thereto on its input lead 786. Accordingly, the output of NOR gate 758 must be zero. It may be recalled that the 708c input for the decimal 8 or 9 representation has a pulse absent condition; the 708d input has a pulse present condition due to the clock pulse applied; the 708a input must necessarily be in the one state since the 708 stage is in the one state. These three conditions, with the impressed condition that 708b must be in the zero state as a consequence of the action of NOR circuitry 785 and lead 778 being in the zero state, means that the clock pulse on lead 26 must switch the state of the 708 stage. It is readily verified that if the lead 778 were in state one, the net result would be that lead 708b would be in the one state; this would result in the failure of stage 708 to change state.

Since lead 777 is in the one state for this count by two operation, we are assured that no other of the stages 701, 702, 708 can possibly change state since the effect of 777 being in the one condition is to block the operation of those stages. Accordingly, we are assured that with this combination of inputs only the 708 stage changes state with a clock pulse. In this way, decade 95 of FIG. 2 counts by two for every clock pulse input irrespective of which decimal number the decade is then representing.

Various factors enter into determining the logic states of leads 777 and 778. Let the letter "U" represent the logic state of lead 777 and the letter "V" the logic state of lead 778. This means a normal count of one is provided for $U=0$ and $V=1$; a count of zero is provided $V=1$, and a count of two is provided when $U=1$ and $V=0$. The logic value of V is dependent upon the following factors: whether or not the distance counter 42 (see FIG. 1) is applying a blocking output signal on lead 93; and whether or not an enabling signal has been generated from the numerical data equipment 21 on lead 22 indicating that the transfer of new data from the buffer storage registers to the active storage registers throughout the control section has been completed. Effectively, a flip-flop (not shown) receives an indication as to whether or not the distance counter has commanded a discontinuance of the application of the pulse train from the function generator 37 on lead 43 to the phase counter. This flip-flop is set to state zero by the application of the signal from the distance counter indicating that the path cut has been completed and the pulse train from the function generator should no longer be applied to the command phase counter. When, however, a new block of data has been transferred into the active storage for the next operation, then the flip-flop has its state changed so that the pulse train from the function generator may be applied and used at the command phase counter. If we represent the state of the flip-flop by the letter "K," then K is equal to zero when the distance counter indicates a block signal, and it is set to one when the transfer of new data to the active storage registers has been completed.

Since counting by zero or by two can only occur when a pulse is applied (which is part of the pulse train whose rate represents commanded velocity) from function generator 37 to the command phase counter 31, both U and V are functions of the appearance or lack of appearance of a pulse on lead 43. The logic state on lead 43 going to the phase counter is represented as variable "L." When L is equal to zero, there is an output from function generator 37 and when it is in the one state there is no output. Both binary variables U and V are dependent upon a synchronizing signal "M."

Since the output pulse of the function generator is a logic state of one or zero maintained for the interval spanned by one computing clock interval which spans a predetermined number (such as 5) of clock pulses on lead 26, each such output pulse is synchronized with a synchronizing signal M to count fast or slow by only one count for each function generator output pulse. This M synchronizing signal is a signal at zero state for one main clock interval preceding each computing clock signal and at state one for other times. This synchronizing signal thus permits only one count up or down (instead of 5) for each function generator output pulse. The M synchronizing signal is derived from states of the divider counter 30 of FIG. 1 which generates the lower frequency computing clock signal.

The last binary variable upon which U and V are dependent, is the direction signal "P" which is the positive or negative sense of motion signal derived from the programmed input data. A negative direction signal conforming to a binary one for down-scale counting results in variable rate counter 95 omitting a clock pulse when a clock pulse is applied on lead 26, while a positive direction signal in the form of a binary zero results in the counter counting two for each clock pulse.

From this the binary logic states of U and V and, therefore, of leads 777 and 778 are completely defined relative to the rest of the system shown in FIG. 1 by the following two equations:

(1) $\quad U = K \cdot \overline{M} \cdot \overline{L}$ (2) $\quad \overline{V} = K \cdot \overline{M} \cdot \overline{L} \cdot P$ Equation 2 defines the conditions required for the counter to count by two, i.e., for $V=0$, while Equation 1 defines the conditions required for the counter to be blocked from fixed rate operation and, therefore, either count by zero or by two, i.e., $U=1$.

Throughout the operation of the entire system shown in FIG. 1, the command phase counter 31 continuously operates and frequently cycles at a variable rate. At all times that the control section is operative there is a pulse output from the command phase counter on lead 19, the phase of which is a function of the summation of the zero count and two count operation of the variable rate decade 95. If the variable rate decade were never commanded to count other than in the normal progression of ones, then the output of the phase counter would be a 250 cycle per second square wave precisely in phase with the 250 cycle per second output from the divide by 1000 pulse rate divider 28 on lead 61. In FIG. 6, curve 795 shows the 250 cycle per second reference square wave out from pulse rate divider 28. Curve 796 shows a 250 cycle per second square wave out from the command phase counter on lead 19 under the condition that the counter has always operated as a normal fixed rate counter. Curve 797 shows the output of the command phase counter when one of the input clock pulses has been counted as two pulses. The phase of curve 797 is slightly in advance of curve 795. Since for one input clock pulse the phase counter counted two output pulses, it follows that the leading edge of the first output pulse (of curve 797) from the last decade of the phase counter will be provided after 999 input clock pulses rather than after 1000 clock pulses as would ordinarily be the case if the phase counter counted exclusively by one. Accordingly, the phase lead of curve 797 over that of 795 is equal to one-thousandth of a cycle of the 250 cycle per second pulse train curve 795. Similarly, curve 798 shws the situation for the output of the phase counter when the counter has counted a zero for one of the input clock pulses. Here the curve 798 lags that of curve 795 slightly. It is approximately one-thousandth of a cycle behind that of curve 795 since the command phase counter had to count one thousand and one input clock pulses before it provided the leading edge of its output pulse. If the velocity command signal from the function generator applied along lead 43 to the command phase counter through appropriate logic arrangements is a pulse train at a steady rate, the phase of curve 797 (or 798 dependent upon whether the velocity is to be in a positive or negative direction) continuously changes relative to curve 795, and at a steady rate. This is because the command phase counter is being told to count two for specified input clock pulses at a fixed rate. Thus, for example, it may be that the frequency of the function generator output pulses is such that it tells the command phase counter to count two pulses for every 25 input clock pulses. Under those circumstances, the phase will change one-thousandth of a period after every 25 input clock pulses. This steady rate of phase shift in the output will change if the pulse rate from the function generator changes. If it does change, the rate of phase shift out from the phase counter will also change.

Throughout the entire operation of the control section of the numerical contouring control system, the command phase counter operates continuously and cyclically and, therefore, need not be reset. However, when the numerical control system is initially started up, it is appropriate to set all of the flip-flops in the command phase counter to the zero state and then start it counting in synchronism with the reference counter. This is readily done by a manual reset lead (not shown) applied to all of the flip-flops in manner well known in the art.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to secure by Letters Patent of the United States is:

1. In a phase sensitive control system, means for generating a phase modulated signal comprising: a pulse counter; means for applying a pulse train input to said counter; first circuit means coupled to said counter for blocking the count of any of the pulses of said train during a first period; and second circuit means coupled to said counter for constraining said counter to increase its count by more than one count for any of said pulses of said train during a second period, whereby the output pulse train of said counter has a variable phase which may range between a leading sense and lagging sense of any magnitude; each of said first and second circuits having input signals that can be in one of solely two states.

2. In a phase sensitive control system, means for genearting a phase modulated signal comprising: a pulse counter; means for applying a first pulse train to said counter; means for applying a second pulse train to said counter with each pulse of said second train in synchronism with a pulse of said first train; and circuit means coupled to said counter for constraining said counter during a given period, to increase its count by two rather than by one when a pulse from said second train is applied to said counter.

3. Apparatus as recited in claim 2 including circuit means coupled to said counter for precluding said counter, during a period other than said given period, from changing its count when a pulse from said second train is applied to said counter.

4. In a phase sensitive control system, means for generating a phase modulated signal comprising: means for generating a first pulse train having a given pulse repetition rate; means for generating a second pulse train having a pulse repetition rate different from that of said first pulse train; a pulse counter coupled to said first and second pulse trains and adapted to count pulses at the rate of said first pulse train; and circuit means coupled to said counter for constraining said counter to increase its count by two rather than by one when a pulse from said second train is applied to said counter in synchronism with a pulse from said first train.

5. Apparatus as recited in claim 4 wherein said rate of said second train is less than said rate of said first train.

6. A variable rate pulse counter comprising: four binary counting stages; circuit means coupled to a plurality of stages for constraining said four counting stages to operate jointly as a decade counter in binary coded decimal form wherein said four stages represent one, two, four and eight units, respectively; means for applying an input pulse train to said counter; circuit means coupled to said two unit stage and to said one unit stage for changing the state of said two unit stage and for precluding the change of state of said one unit stage with the application of an input pulse from said pulse train to said counter whenever the permutation of states of said four stages represents a decimal number of zero to seven, inclusive, in binary coded decimal form.

7. A variable rate pulse counter comprising: four binary counting stages; circuit means coupled to a plurality of said stages for constraining said four counting stages to operate jointly as a decade counter in binary coded decimal form wherein said four stages represent one, two, four and eight units, respectively; means for applying an input pulse train to said counter; circuit means coupled to said eight unit, two unit and one unit stages for changing the state of said eight unit stage and for precluding the change of state of said two unit and one unit stages with the application of an input pulse from said pulse train to said counter whenever the permutation of states of said four stages represents the decimal number of eight or nine in binary coded decimal form.

8. A variable rate pulse counter comprising: means for generating a pulse train having a given pulse repetition rate; a multiplicity of binary counting stages arranged to represent a multiplicity of numbers in a given radix; means coupling said pulse train to a first one of said stages for normally changing the binary state of said first stage with every application of a pulse from said pulse train; circuit means, having two control inputs, coupled to a plurality of said stages including said first stage for precluding said first stage from changing state with the application of a pulse from said pulse train when said two control inputs are in a first permutation of binary states, and for changing the state of a second stage of said multiplicity of stages to the exclusion of all the other of said stages when said two control inputs are in a second permutation of binary states and said multiplicity of counting stages represent any of a first plurality of numbers in said given radix, and additionally for changing the state of a third stage of said multiplicity of stages to the exclusion of all the other of said stages when said two control inputs are in a third permutation of binary states and said multiplicity of counting stages represent any of a second plurality of numbers in said given radix which are different from said first plurality of numbers.

9. In phase sensitive control apparatus, means for phase modulating a pulse train, comprising: means for generating an input pulse train having a given pulse repetition rate; a pulse counter comprising four binary stages coupled together to count cyclically with the cycle normally fixed by a given number of said input pulses; means for coupling said input pulse train to said counter; circuit means, having two control inputs, coupled to a plurality of said binary stages for decreasing the number of input pulses below said given number to fix a counter cycle different from said normal cycle for a first permutation of binary states of said two control inputs, and for increasing the number of input pulses above said given number to fix a counter cycle different from said normal cycle for a second permutation of binary states of said two control inputs which is different from said first permutation; each of said two control inputs being constrained to assume one of solely two possible states.

10. Phase modulating means as recited in claim 9 wherein the binary states of said control inputs are changed while said counter is counting said input pulse train.

11. Phase modulating means as recited in claim 9 wherein said cycle for said first permutation of states of said two control inputs has a period for any given input pulse rate which is shorter than that of said normal cycle.

12. In a phase sensitive control system, means for phase modulating a pulse train, comprising: means for generating a first input pulse train having a given pulse repetition rate; means for generating a second input pulse train having a pulse repetition rate less than that of said first train but with each pulse of said second train substantially in synchronism with a pulse of said first train; a pulse counting circuit; means for applying said first and second pulse trains to said counting circuit in parallel; said counting circuit including means responsive to said second input pulse train for changing the phase of the pulse train output from said counting circuit by a fraction of a cycle equal substantially to one divided by said given pulse repetition rate of said first pulse train, for every pulse in said second train applied to said counting circuit in any cycle.

13. In phase sensitive control apparatus, means for phase modulating a pulse train, comprising: four bistable multivibrators interconnected to count pulses as a first binary coded demical counter decade with said multivibrators representing one, two, four and eight decimal units, respectively; second and third binary coded decimal decades connected serially to an output lead of said eight unit multivibrator; a pulse train phase comparison circuit coupled to the output of said third decade; means for applying an input pulse train to be counted to said first decade; and circuit means having two input control leads for constraining solely said two unit multivibrator to change its state with the application of an input pulse of said input pulse train to said first decade for a first set of states of said control leads, and for constraining solely said eight unit multivibrator to change its state with the application of an input pulse of said input pulse train to said first decade for a second set of states of said control leads.

14. In combination, a pulse counter, a pulse train phase comparison circuit coupled to the output of said counter, a pulse train input to said counter, and logic circuit means coupled to said counter for constraining said counter to count a one, a two, or a zero for any pulse of said pulse train input dependent upon the logic state of said circuit means; said logic state of said circuit means being determined by a plurality of input signals, each one of which is capable of being in one of solely two possible states.

15. A combination as recited in claim 14 wherein said counter is arranged to count in binary coded decimal form.

References Cited by the Examiner

UNITED STATES PATENTS

| | | | |
|---|---|---|---|
| 2,820,187 | 1/1958 | Parsons et al. | 318—39 |
| 2,833,941 | 5/1958 | Rosenberg et al. | 307—149 |
| 2,864,010 | 12/1958 | Rosenberg et al. | 307—149 |
| 2,896,514 | 7/1959 | Rosenberg | 90—28.1 |
| 2,921,740 | 1/1960 | Dobbins et al. | 235—197 |
| 2,922,940 | 1/1960 | Mergler | 318—162 |
| 2,927,735 | 3/1960 | Sciutto | 235—192 |
| 2,933,249 | 4/1960 | Sciutto | 235—152 |
| 2,943,248 | 6/1960 | Ritchey | 318—23 |
| 2,949,578 | 8/1960 | Narud | 328—34 |
| 2,998,917 | 9/1961 | Werme | 235—151 |
| 3,011,110 | 11/1961 | Ho et al. | 328—133 |
| 3,011,709 | 12/1961 | Jacoby | 235—151 |
| 3,025,000 | 3/1962 | Tabach | 235—197 |
| 3,036,270 | 5/1962 | Reichert | 328—34 |

OTHER REFERENCES

Electrical Manufacturing, November-December 1954, "Adjusting Digital Techniques for Automatic Control I," B. M. Gordon.

ARTHUR GAUSS, *Primary Examiner.*

DARYL COOK, *Examiner.*